United States Patent [19]
Woo

[11] 3,831,489
[45] Aug. 27, 1974

[54] TUBULAR PUSH ROD MEANS FOR SERVOMOTOR

[75] Inventor: Ji Yah Woo, South Bend, Ind.

[73] Assignee: The Bendix Corporation, South Bend, Ind.

[22] Filed: Nov. 13, 1972

[21] Appl. No.: 306,256

[52] U.S. Cl. ............... 91/32, 91/369 A, 91/376
[51] Int. Cl. ................... F01b 25/04, F15b 9/10
[58] Field of Search .......... 91/6, 28, 31, 32, 369 A, 91/369 B, 369 R, 376 R

[56] References Cited
UNITED STATES PATENTS

| | | | |
|---|---|---|---|
| 3,434,388 | 3/1969 | Julow et al. | 91/6 |
| 3,633,363 | 1/1972 | Larsen | 91/6 |
| 3,638,528 | 2/1972 | Lewis | 91/6 |
| 3,712,176 | 1/1973 | Meyers | 91/6 |

Primary Examiner—Paul E. Maslousky
Attorney, Agent, or Firm—Leo H. McCormick, Jr.; William N. Antonis

[57] ABSTRACT

A control valve for a servomotor wherein vacuum, air at atmospheric pressure and air above atmospheric pressure are sequentially communicated to a rear chamber of the servomotor to create an operational pressure differential across a movable wall with vacuum in a front chamber to develop an input force to meet an operational output condition.

10 Claims, 1 Drawing Figure

PATENTED AUG 27 1974
3,831,489
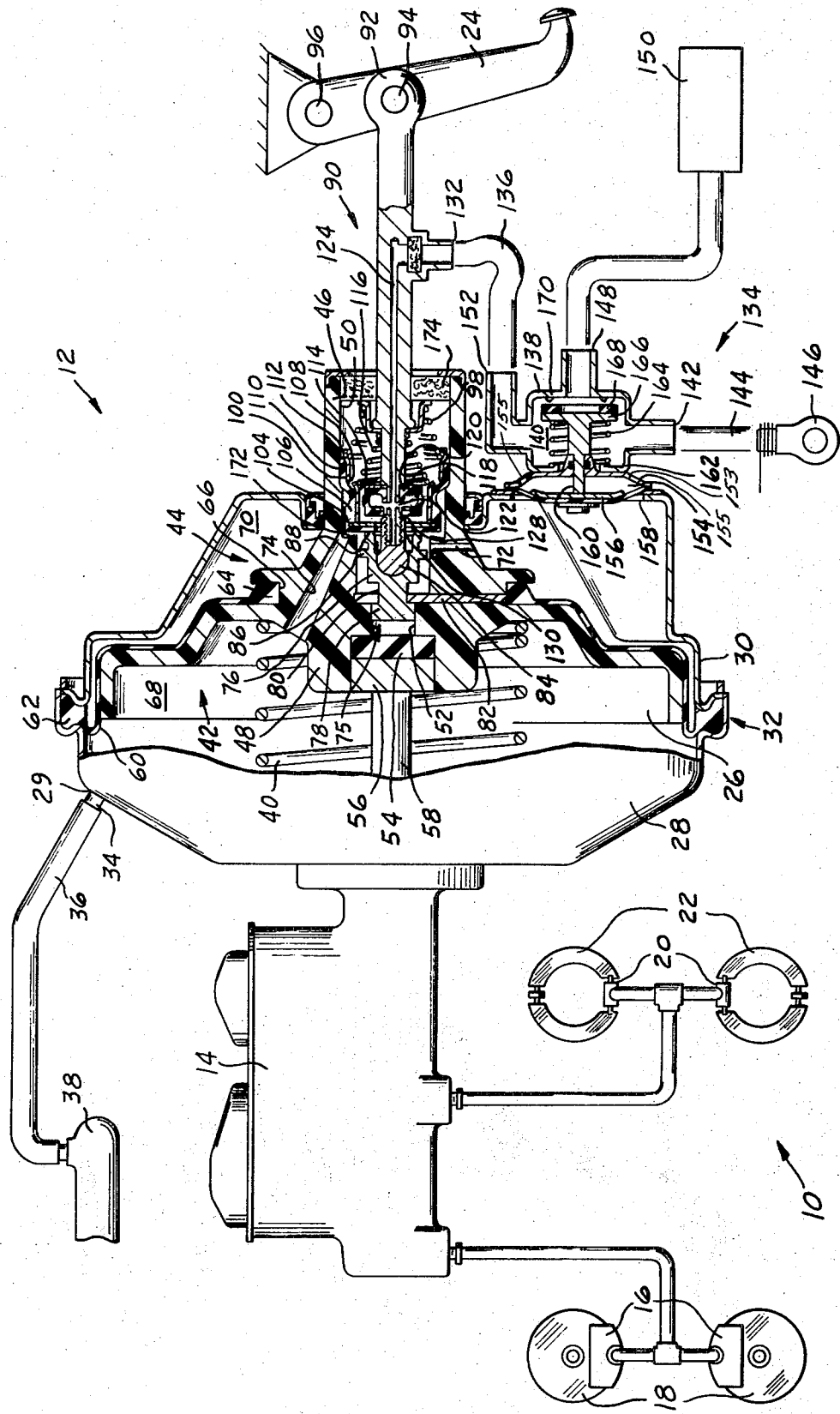

TUBULAR PUSH ROD MEANS FOR SERVOMOTOR

BACKGROUND OF THE INVENTION

The engines of automobiles presently manufactured in the United States of America are required to have emission control apparatus in an attempt to reduce air pollution. However, most emission control apparatus reduce the level of vacuum developed at the intake manifold and as a result the pressure differential between such vacuum and air atmospheric pressure utilized for operating a servomotor powered braking system is correspondingly also reduced. To compensate for this reduction in vacuum it was originally thought, as disclosed in U.S. Application Pat. No. 217,983 incorporated herein by reference, that an individual air pump would be required to provide pressurized air to operate the braking system.

Under test conditions it has been determined that even with this reduction in vacuum, the resulting vacuum/air pressure differential is normally adequate for developing a sufficient pressure in the braking system to stop a vehicle within existing safety standards. However, during panic stops and on stops on steep uphill grades the available vacuum/air pressure differential has occasionally been inadequate to bring the vehicle to a stop within the safety standards.

In copending U.S. Application U.S. Pat. Application No. 306,265 filed Nov. 13, 1972 incorporated herein by reference, a poppet valve means located in the control valve of the servomotor is activated in response to the position of the plunger within the control chamber. However, if the vacuum in the front chamber due to the emission controls is greatly reduced, before an operational pressure differential can be developed, the plunger must be fully depressed to allow air above atmospheric pressure to operate the servomotor. This type servo-motor, while adequately functioning during periods of sufficient vacuum, will result in a slower activated servomotor than is desirable under some operating conditions.

SUMMARY OF THE INVENTION

I have devised a servomotor wherein an operational pressure differential is sequentially developed by air at atmospheric pressure and air above atmospheric pressure through a control valve means to immediately meet an existing operating condition. A sensing means connected to the servomotor monitors the potential pressure differential capable of being created in the servomotor. When the potential pressure differential as monitored by the sensing means reaches a predetermined value through a reduction of vacuum in the rear chamber, air above atmospheric pressure from a source is directed to a tubular input push rod. The tubular input push rod has an annular poppet means which surrounds an opening adjacent a spherical end. The spherical end engages a plunger means which has an atmospheric valve seat on the rear surface thereof. The atmospheric valve seat is urged against a face of a control valve poppet means by the interaction of a return spring acting on the push rod means and a poppet spring acting on the face with the push rod means in a first or rest position. Upon the operator applying an operational input to the push rod means the plunger will be moved permitting the poppet spring to seat the face of the poppet on a vacuum seal while allowing air at atmospheric pressure to pass into the rear chamber around the atmospheric valve seat in an applied or second position. With the sensing means continually monitoring the fluid pressure in the rear chamber, and directing the air above atmospheric pressure to the tubular push rod means, upon moving the plunger means to a fully applied or third position the annular poppet means is seated on the rear of the face of the control poppet means and compressed to allow the air above atmospheric pressure to be communicated into the rear chamber and fortify the pressure differential to meet the existing operational demand.

It is, therefore, the object of this invention to provide a braking system with a servomotor having control means for sequentially communicating a power chamber with air at atmospheric pressure and air above atmospheric pressure to create a pressure differential across a wall means to develop an output force to satisfy a braking demand.

It is a further object of this invention to provide a servomotor which is capable of being operated by a pressure differential created by vacuum and atmospheric air pressure, vacuum and air above atmospheric pressure and air at atmospheric pressure and air above atmospheric pressure.

It is another object of this invention to provide a control means for a servomotor with a push rod having an annular poppet activated by engaging a control poppet to provide communication between a source of air above atmospheric pressure and the rear chamber of the servomotor for developing an operational pressure differential to meet an output requirement.

It is still a further object of this invention to provide a servomotor with a sensing means to monitor the potential pressure differential available in a servomotor between vacuum and air at atmospheric pressure and upon the potential pressure differential reaching a predetermined level diverting air above atmospheric pressure from a source to the servomotor for intensifying the potential pressure differential in response to an operational condition.

These and other objects will become apparent from reading this specification and viewing the drawings.

BRIEF DESCRIPTION OF THE DRAWING

The drawing shows a schematic braking system with a sectional view of a servomotor control means for sequentially providing an output force derived from a pressure differential developed by air at atmospheric pressure and air above atmospheric pressure to meet existing braking conditions.

DETAILED DESCRIPTION OF THE PREFERRED EMBODIMENT

The braking system 10 for a vehicle shown in the drawing has a servomotor means 12 connected to a master cylinder 14 for supplying pressurized hydraulic fluid to wheel cylinders 16 of the front brakes 18 and to wheel cylinders 20 of the rear brakes 22 in response to an operator input on the brake pedal 24.

In more particular detail, the servomotor means 12 has a housing 26 formed by a front shell 28 being joined to a rear shell 30 through a twist lock connection 32. The front shell 28 has an opening 29 into which a check valve 34 is inserted to provide one way communication between the servomotor means 12 through conduit 36 and the intake manifold 38 of a vehicle. A return spring 40 positioned against the front shell 28 moves a wall means 42 against the rear shell 30. The wall means 42 includes hub means 44 which has a rearward projection 46 which extends through the rear shell 30 and a forward projection 48. An axial bore 50 extends through the hub means with a guide surface 52 physically separating the functional operations performed in the front projection 48 and the rear projection 46. A deformable disc 54 located in the axial bore 50 of the front projection abuts the guide surface 52. The deformable disc 54 contacts head 56 of the output push rod 58 to transmit a reactive force from the master cylinder 14 back to the brake pedal 24. The wall means 42 has a diaphragm 60 with an external bead 62 held by the twist lock connection 32 and an internal bead 64 which snaps into a groove 66 in the hub means 44 to separate a front chamber 68 from a rear chamber 70. The axial bore 50 is connected to the rear chamber 70 through a first passage 72 and to the front chamber 68 through a second passage 74. A plunger means 75 located in the axial bore 50 has a cylindrical body 76 with a groove 80 adjacent a first guide surface 78. The first guide surface 78 is mated with guide surface 52 and retained therein by key 82 surrounding the cylindrical body 76 at groove 80. A second guide surface 86 is located adjacent groove 80 to maintain the plunger means 74 in axial alignment with the output push rod 58. An atmospheric valve seat 88 located on the rear of the cylindrical body 76 surrounds an opening which receives spherical head member 84 of the push rod means 90. The first and second guide surfaces maintain the plunger means 75 in axial alignment upon being moved by the push rod means 90 as the eye 92 on the end thereof pivots on pin 94 when the brake pedal 24 correspondingly pivots on pin 96 in response to an operational input force. A first resilient means 98 has one end positioned on an expanded ring 100 and another end on a keeper 102 which is secured to the push rod means 90. The first resilient means 98 acts on the push rod means 90 to urge the atmospheric valve seat 88 into contact with the front of face 104 of a control poppet 106. The control poppet has a flexible section 108 between a lip portion 110 which fits into a groove 112 on the interior of the axial bore 50. The lip portion 110 is held in groove 112 by the expander ring 100. A sleeve 114 is secured to the rear of face 104 to provide stability to the control poppet and a surface for retaining one end of a second resilient means 116. The other end of the second resilient means is connected to the keeper 102 on the push rod means 90. The second resilient means acts on the sleeve to urge the front of face 104 into an atmospheric seal with the atmospheric valve seat 88 in a first or released position as shown in the drawing. A second poppet 118, annular or torus in shape, has a first lip 120 secured to the push rod means 90 adjacent an outlet 122 for passage 124 in the tubular portion 126 of the push rod means 90 and a second lip 128 adapted to contact an adjustable seat 130 on the spherical ball member 84 and seal the passage 124. An opening 132 into passage 124 is connected to a sensing means 134 by a conduit 136.

The sensing means 134 has a housing 138 with a control chamber 140 which has an inlet port 142 connected through conduit 144 to a source of air above atmospheric pressure, typically an emission control pump 146, a first outlet port 148 connected to an emission control apparatus such as a thermo reactor 150 in an exhaust system, and a second outlet port 152 connected to conduit 136 going to the push rod means 90 of the servomotor means 12. A plate 153 having a series of openings 155 is secured to the back of the rear shell 30 to form an atmospheric chamber 154. The atmospheric chamber 154 is separated from the rear chamber 70 by a diaphragm or wall means 156 which covers opening 158 in the rear shell 30. A shaft 160 retained in a bearing wall 162 has a first end connected to the diapragm means 156 and a second end with a disc 166 thereon. A resilient means 164 is located between the disc 166 and the bearing wall 162 and urges a resilient face 168 on the disc toward a high pressure seat 170 which surrounds the first outlet.

MODE OF OPERATION OF THE PREFERRED EMBODIMENT

With an engine running the vacuum produced at the manifold will evacuate air from the front chamber 68 and rear chamber 70 of the servomotor means 12. This vacuum in the rear chamber will be present at the sensing means 134 to create a pressure differential with the air at atmospheric pressure in the atmospheric chamber 154 to develop a monitored pressure differential across the diaphragm means 156. This monitored pressure differential will overcome resilient means 164 to move the resilient face 168 away from seat 170 to allow air above atmospheric pressure to freely flow to the emission control device 150.

Upon an operator applying an input force to the brake pedal 24, push rod means 90 will be moved allowing spring 116 to move the front of face 104 against a vacuum valve seat 172 located between the second passage 74 and first passage 72. Further movement of the push rod will move the atmospheric valve seat away from the first face to allow air at atmospheric pressure to flow through the filter 174 into the axial bore 50 and out the first passage 72 into the rear chamber. With air in the rear chamber 70 and vacuum in the front chamber an operational pressure differential will be created across the wall means 42 to develop an output force causing the wall means to move push rod 58. Movement of push rod 58 will energize the master cylinder 14 to provide pressurized hydraulic fluid to operate the front brakes 18 and rear brakes 22.

As the air at atmospheric pressure enters the rear chamber the pressure differential across the diaphragm means 156 of the sensing means 134 will be proportionally reduced to a level where the resilient means 164 will move the resilient face 168 against seat 170 and seal the flow communication from the pump means 146 through the first outlet 148.

In the event that the input force from the operator has moved the plunger means 75 to a third position, lip 128 will engage the rear of face 104 causing the annular poppet to be compressed allowing the air above atmospheric pressure to flow through the openings 122 into the rear chamber through the first passage to reinforce the operational pressure differential to meet a desired braking condition.

In the event that the vacuum level produced at the manifold is insufficient to evacuate the air from the front chamber 68 and rear chamber 70 to a predetermined level, the monitored pressure differential in the sensing means 134 will not be strong enough to move shaft 160 against the influence of resilient means 164. Thus resilient means 164 will maintain resilient face 168 against seat 170 directing the entire supply of air above atmospheric pressure through the second outlet 152 to the servomotor 12 for immediate use upon activation of the annular poppet 118 by movement of the push rod means 90.

Now upon the operator moving the push rod means 90, the plunger means 75 will immediately be moved to the third position allowing this air above atmospheric pressure to enter the rear chamber 70 and create a pressure differential across the wall means 42 with the fluid in the front chamber which in this instance may be air at atmospheric pressure. Thus this pressure differential will provide an operator with a power assist in energizing the master cylinder 14 to pressurize the hydraulic fluid in the braking system.

I claim:

1. In a servomotor having a wall means separating a front chamber from a rear chamber, valve control means for regulating the communication of a fluid, whose pressure varies over a range from a vacuum to air at atmospheric pressure to air above atmospheric pressure, to said rear chamber to create an operational pressure differential across said wall means with a fluid at a vacuum pressure in the front chamber in response to an input force reacting to an operational output condition, said valve control means comprising:

hub means connected to said wall means having a housing with a bore therein, said housing having a first passage connecting said bore with the rear chamber and a second passage connecting said bore with the front chamber, said hub means having a vacuum seat located between said first and second passages;

first poppet means located in said bore having a face on a first end with an opening therethrough and a lip on a second and secured to the housing surrounding said bore;

sensing means connected to said rear chamber for comparing the pressure of the fluid therein with the pressure of air at atmospheric pressure to create an actuation output for directing said air above atmospheric pressure to said servomotor;

tubular push rod means having one end connected to a head member and another end connected to an actuator, said tubular push rod means having a first opening adjacent the actuator connection, said first opening being connected by a conduit to said air above atmospheric pressure at the sensing means and a second opening adjacent said head;

said poppet means having a first rib secured to said tubular push rod means between said first and second openings and a second inwardly projecting rib located between said second opening and said head member, said air under pressure being communicated through said tubular push rod means and out said second opening into said second poppet means to urge said second rib against said head member and contain said air under pressure in said tubular push rod means; and plunger means connected to said head member and located in said axial bore, said plunger means being moved by an input force from an operator for sequentially regulating the communication of a vacuum available in said second passage through the first passage into the rear chamber in a first position, the communication of air at atmospheric pressure through the bore into the rear chamber through the first passage upon termination of the vacuum communication through the second passage by engagement of the first poppet means with said vacuum seat in a second position, and the communication of air above atmospheric pressure contained in the tubular push rod means into the rear chamber upon engagement of the second rib of the second poppet means with the first poppet means in a third position to develop said operational output.

2. The servomotor, as recited in claim 1, wherein said sensing means includes:

a housing having a control chamber and an atmospheric chamber, said control chamber having an inlet port connected to a source of air above atmospheric pressure, a first outlet port connected to a pressurized air control apparatus and a second outlet port connected to said second opening; and flexible wall means connected to said housing for separating said atmospheric chamber from said rear chamber, said flexible wall means moving in response to a pressure differential between air in said atmospheric chamber and the pressure of the fluid in said rear chamber to establish a flow path through said housing from the inlet port to the first and second outlet ports.

3. The servomotor, as recited in claim 2, wherein said sensing means further includes:

a shaft retained in said housing having a first end connected to said flexible wall means and a second end extending into said control chamber to a location adjacent said first outlet port, said second end having a face thereon being adapted to move toward a seat surrounding said first outlet port with a corresponding movement by said flexible wall means.

4. The servomotor, as recited in claim 3, wherein said sensing means further includes:

first resilient means located in said control chamber and connected to said second end of said shaft for urging said face against said seat in opposition to said pressure differential.

5. The servomotor, as recited in claim 1, wherein said first poppet means includes:

a sleeve member secured to said face and extending toward said lip for providing stability to a flexible section located therebetween.

6. The servomotor, as recited in claim 1, wherein said plunger means includes:

a cylindrical body located in said axial bore having an atmospheric valve seat on the rear face thereof, said atmospheric valve seat being concentric to said vacuum seat located between said first and second passages.

7. The servomotor as recited in claim 6, wherein said tubular push rod means further includes:

first resilient means located in said axial bore for urging said atmospheric valve seat against said face of the first poppet means to allow vacuum communication through the second passage in said first position.

8. The servomotor, as recited in claim 7, wherein said tubular push rod means further includes:

second resilient means for urging said face against said annular vacuum seat to seal said second passage when said atmospheric valve seat is opened as said tubular push rod reaches said second position.

9. The servomotor, as recited in claim 8, wherein said hub means further includes:
a resilient disc located in said axial bore between said cylindrical body and an output push rod to provide a reaction force with said pressure differential corresponding to an input from the operator at said second position to create a balance across said wall means allowing said atmospheric valve to seat on said face.

10. The servomotor, as recited in claim 9, wherein said input force from said operator causes said second rib of the second poppet means to contact said first poppet means and with any further input allows said second poppet means to be compressed allowing air above atmospheric pressure to enter said rear chamber in said third position, said fluid pressure in said rear chamber reducing the pressure differential across a flexible wall means of the sensing means permitting a third resilient means to move said shaft and seal a first outlet port upon the face on the end thereof engaging the seat surrounding the first outlet port to divert the entire source of air above atmospheric pressure through a second outlet port to the tubular push rod means.

\* \* \* \* \*